(12) United States Patent
Seberger (10) Patent No.: US 9,582,378 B2
(45) Date of Patent: *Feb. 28, 2017

(54) CONTROL SIGNAL PROTECTION DEVICE (71) Applicant: FISHER CONTROLS INTERNATIONAL LLC, Marshalltown, IA (US)

(72) Inventor: Stephen G. Seberger, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 297 days.

This patent is subject to a terminal disclaimer.

(21) Appl. No.: 14/255,913

(22) Filed: Apr. 17, 2014

(65) Prior Publication Data

US 2015/0051716 A1 Feb. 19, 2015

Related U.S. Application Data (63) Continuation of application No. PCT/US2013/055022, filed on Aug. 14, 2013.

(51) Int. Cl.
*G06F 11/20* (2006.01)
*H02H 9/02* (2006.01)
(Continued)

(52) U.S. Cl.
CPC ............ *G06F 11/2017* (2013.01); *G05B 9/02* (2013.01); *G05B 19/0425* (2013.01);
(Continued)

(58) Field of Classification Search
CPC ... G05B 7/02; H04L 69/40; H02J 9/04; H02H 3/12; H02H 9/02; Y10T 307/505; Y10T 307/625
(Continued)

(56) References Cited

U.S. PATENT DOCUMENTS 5,184,122 A * 2/1993 Decious .................. G05B 7/02
165/265
8,253,277 B2 * 8/2012 Lin ......................... H02J 1/108
307/43
(Continued)

FOREIGN PATENT DOCUMENTS

WO    WO-99/41830 A1    8/1999

OTHER PUBLICATIONS

International Search Report and Written Opinion for PCT/US2013/054706, mailed Nov. 21, 2013.
(Continued)

*Primary Examiner* — Stephen W Jackson
*Assistant Examiner* — Christopher Clark
(74) *Attorney, Agent, or Firm* — Marshall, Gerstein & Borun LLP (57) ABSTRACT

A control signal protection device protects a current-receiving field device from an undesirable interruption in a control signal provided to the field device. The control signal protection device includes a first terminal to connect the signal protection device to a control system and a second terminal that connects the control signal protection device to a field device. The control signal device further includes a power storing element for temporary accumulation of electric energy and a switching circuit for controlling operational mode of the signal protection device. Electric energy is stored in the power storing element in a first operational mode. Electric energy stored in the power storing element is supplied to a positive terminal in the second terminal pair in a second operational mode.

21 Claims, 4 Drawing Sheets

(51) Int. Cl.
  *G05B 19/042* (2006.01)
  *G05B 9/02* (2006.01)
  *H02H 1/00* (2006.01)
(52) U.S. Cl.
  CPC ............ *H02H 1/0084* (2013.01); *H02H 9/02* (2013.01); *G05B 2219/24141* (2013.01); *G05B 2219/24197* (2013.01); *Y02B 70/3241* (2013.01); *Y04S 20/227* (2013.01); *Y10T 307/625* (2015.04)
(58) Field of Classification Search
  USPC .............................. 361/79, 86, 87; 307/48, 66
  See application file for complete search history.

(56) References Cited

U.S. PATENT DOCUMENTS

| | | | |
|---|---|---|---|
| 8,332,567 B2* | 12/2012 | Burr .................... | G05B 19/042 710/25 |
| 8,427,108 B2* | 4/2013 | Swenson ................. | H02J 7/34 307/48 |
| 8,762,618 B2* | 6/2014 | Burr .................... | G05B 19/042 251/129.01 |
| 8,780,695 B2* | 7/2014 | Grosso .................. | 370/217 |
| 2002/0083364 A1 | 6/2002 | Christensen et al. | |
| 2002/0179720 A1* | 12/2002 | Liva ..................... | H04M 3/08 235/492 |
| 2002/0184410 A1 | 12/2002 | Apel et al. | |
| 2006/0233204 A1* | 10/2006 | Pomaranski ......... | G06F 11/2005 370/535 |
| 2007/0076341 A1 | 4/2007 | Lee et al. | |
| 2007/0083275 A1* | 4/2007 | Law .................. | G05B 19/41855 700/19 |
| 2008/0019264 A1* | 1/2008 | Lafleur ............... | H04L 12/5601 370/217 |
| 2008/0126665 A1* | 5/2008 | Burr ...................... | G05B 19/042 710/316 |
| 2009/0077275 A1* | 3/2009 | Zhang ................. | G06F 11/2007 710/38 |
| 2010/0185857 A1* | 7/2010 | Neitzel .............. | G05B 19/0428 713/168 |
| 2012/0043938 A1* | 2/2012 | Swenson .................. | H02J 7/34 320/128 |
| 2013/0057071 A1* | 3/2013 | Babula ...................... | H02J 7/34 307/48 |
| 2015/0051716 A1* | 2/2015 | Seberger ................. | G05B 9/02 700/22 |

OTHER PUBLICATIONS

International Search Report and Written Opinion for PCT/US2013/055022, mailed Nov. 21, 2013.
International Preliminary Report on Patentability for PCT/US2013/054706, mailed Feb. 26, 2015.
International Preliminary Report on Patentability for PCT/US2013/055022, mailed Feb. 26, 2015.
Office Action issued in Chinese Patent Application No. 2013800106160, dated Jul. 28, 2016.

* cited by examiner

CONTROL SIGNAL PROTECTION DEVICE

FIELD OF THE INVENTION

The present invention relates generally to control signals for controlling field devices in a process control system, more particularly, to a method and apparatus for protecting control signals.

DESCRIPTION OF THE RELATED ART

Process control systems, such as those used in chemical, petroleum and other processes, generally include one or more centralized or decentralized process controllers communicatively coupled to at least one host workstation, and to one or more process control and instrumentation devices, via analog, digital, or combined analog/digital buses. Field devices such as valves, valve positioners, switches, transmitters, and sensors (e.g., temperature, pressure, or flow rate sensors) perform various functions within the process, such as opening or closing valves or measuring process parameters. The process controller receives (via the communication buses) signals indicative of process measurements or process variables made by or associated with the field devices, implements a control routine based on the received information, and generates control signals which are sent over one or more of the buses to the field devices to control the operation of the process. Information from the field devices and the controller is typically made available to one or more applications executed by a host workstation to enable an operator to perform desired functions with respect to the process, such as viewing the current state of the process, modifying the operation of the process, etc.

"Smart" field devices that perform one or more process control functions have become prevalent in the process control industry. In addition to performing a primary function within the process (e.g., monitoring a temperature or controlling a valve position), each smart field device includes a memory and a microprocessor. The memory stores data pertaining to the device, and the microprocessor communicates with the controller and/or other devices, and/or performs secondary tasks such as self-calibration, identification, diagnostics, etc. A number of standard, open, digital or combined digital and analog communication protocols such as the Highway Addressable Remote Transducer (HART®), PROFIBUS®, FOUNDATION™ Fieldbus, WORLDFIP®, Device-Net®, and Controller Area Network (CAN) protocols have been developed to enable smart field devices made by different manufacturers to communicate with one another while performing one or more process control functions.

Control signals are typically provided to field devices via input/output (I/O) cards that convert control signals to a desired format suited for the particular field devices to which the control signals are being provided. In order to improve control system robustness, control systems sometimes employ redundant I/O cards for controlling a field device. In such control systems, operation is switched from a primary I/O card to a back-up I/O card in an event of failure of the primary I/O card. Such redundant I/O card configuration generally allows a process being controlled to continue functioning without any significant interruption when an I/O card fails to operate properly. In some systems, an I/O card controller is configured to switch I/O card operation from the primary I/O card to the back-up I/O card periodically for verification of functionality of the back-up I/O card. I/O card switchover from a primary I/O card to a back-up I/O card (or vice versa) typically results in a short interruption in the control signal provided to the field device. Some field devices respond to the control signal interruption in an undesirable manner. For example, if the field device being controlled is a valve, a valve controller may control the valve to move to an undesired position, potentially disrupting the process.

SUMMARY

In a first exemplary aspect, a control signal protection device operates in a first or in a second operational mode. In the first operational mode, the control signal protection device stores energy in a power storing element in the control signal protection device. In the second operational mode, the control signal protection device utilizes the stored energy to sustain a control signal at the output of the device, such as in an event of an interruption in the control signal at the input of the device. In one embodiment, the signal protection device includes a first terminal to connect the signal protection device to a control system that provides a control signal, and a second terminal to connect the signal protection device to a field device for providing the control signal to the field device. The signal protection device also includes a switching circuit coupled to the first terminal, the second terminal, and the power storing element. The switching circuit is configured to control the operational mode of the signal protection device in response to variation in current level at the second terminal of the control signal protection device.

In further accordance with the first exemplary aspect, the control signal protection device may further include, in any combination, any one or more of the following preferred forms.

In one preferred form, the switching circuit is configured to switch the operational mode from the first operational mode to the second operational mode in response to detecting a decrease in the level of electric current at the second terminal.

In another preferred form, the switching circuit is further configured to switch the operational mode from the second operational mode to the first operational mode in response to detecting that the level of electric current at the second terminal has stopped decreasing.

In another preferred form, the power storing element includes at least one capacitor.

In another preferred form, the power storing element includes a first capacitor and a second capacitor. In this preferred form, electric energy is accumulated in the first capacitor and in the second capacitor in the first operational mode and electric energy is transferred from the first capacitor and the second capacitor to the second terminal in the second operational mode.

In another preferred form, the switching circuit includes a first switching element and a second switching element. The first switching element and the second switching element are arranged such that in the first operational mode, the first switching element is kept in a conducting state such that sufficient current flows through the first switching element to keep the second switching element in a sufficiently non-conductive state, and the sufficiently non-conductive state of the second switching element causes accumulation of energy in the power storing element.

In another preferred form, the first switching element and the second switching element are further arranged such that a decrease in the level of electric current at the second terminal causes a decrease in conductivity of the first switching element, and the decrease in conductivity of the first switching element causes an increase in conductivity of the second switching element to cause the transfer of energy stored in the power storing element to the second terminal in the second operational mode.

In another preferred form, each of the first switching element and the second switching element is a Bipolar Junction Transistor (BJT).

In another preferred form, the control signal protection device further comprising a current monitoring element coupled to the second terminal to detect the variation of current level at the second terminal.

In another preferred form, the current monitoring element is a resistor.

In another preferred form, the first operational mode is a normal mode in which the control signal is provided to the first terminal, and wherein the second operational mode is a protection mode in which the control signal is not provided to the first terminal.

In accordance with a second exemplary aspect, a method of protecting a control signal provided to a field device in a process control system involves providing a host station and communicatively coupling the host station to an input output (I/O) system having a plurality of I/O cards including a first card and a second card, for providing the control signal to the field device via the I/O system. The I/O system is configured to selectively switch operation from the first card to the second card such that the control signal is provided to the field device via the first card or via the second card. The method also involves providing the control signal from the host station via the I/O system to an input of a control signal protection device and communicatively coupling an output of the control signal protection device to the field device. The control signal protection device switches from a first operational mode to a second operational mode during a transition of operation, in the I/O system, from the first card to the second card. In an embodiment, the control signal protection device transitions from the first operational mode to the second operational mode in response to detecting a decrease in a level of electric current at the output of the control signal protection device. In an embodiment, the first operational mode is a regular mode in which energy is accumulated in a power storing element in the signal protection device, and the second operational mode is a protection mode in which power accumulated in the power storing element is supplied to the output of the signal protection device. The power supplied to the output of the signal protection device in the second operational mode may allow the signal protection device to sustain the control signal at the output of the signal protection device when the control signal is temporarily interrupted at the input of the signal protection device, for example during transition of operation from the first card to the second card, and vice versa, at the I/O system.

In further accordance with the second exemplary aspect, the method may further include, in any combination, any one or more of the following preferred forms:

In one preferred form, the method further comprises storing electric energy in a power storing element of the control signal protection device in the first operational mode, and supplying electric energy stored in the power storing element to the output of the control signal protection device in the second operational mode.

In another preferred form, storing electric energy in the power storing element comprises storing the electric energy in a first capacitor and a second capacitor, and supplying electric energy to the output of the control signal protection device comprises transferring electric energy stored in the first capacitor and in the second capacitor to the output of the control signal protection device.

In another preferred form, the method further comprising causing the control signal protection device to transition from the second operational mode to the first operational mode in response to detecting that the level of electric current at the output of the signal protection device has stopped decreasing.

In accordance with a third exemplary aspect, a system for controlling a field device in a process control system comprises a host station and a plurality of input/output (I/O) cards coupled to the host station for providing a control signal to the field device. The plurality of I/O cards includes a primary I/O card and a back-up I/O card. The system also comprises an I/O card controller configured to selectively switch between the primary I/O card and the backup I/O card. The system also comprises a control signal protection device having an input communicatively coupled to the I/O cards and an output communicatively coupled to the field device. The control signal protection device is configured to transition from a first operational mode to a second operational mode in response to detecting a decrease in a level of electric current at the output of the control signal protection device to sustain the control signal at the output of the control signal protection device during a switchover operation between the primary I/O card and the backup I/O card, or vice versa.

In further accordance with the third exemplary aspect, the system may further include, in any combination, any one or more of the following preferred forms.

In one preferred form, the control signal protection device is configured to store electric energy in a power storing element in the first operational mode, and supply electric energy stored in the power storing element to the output terminal in the second operational mode.

In another preferred form, the power storing element includes at least one capacitor.

In another preferred form, the power storing element includes a first capacitor and a second capacitor. In this preferred form, electric energy is accumulated in the first capacitor and in the second capacitor in the first operational mode, and electric energy is transferred from the first capacitor and the second capacitor to the output terminal in the second operational mode.

In another preferred form, the power storing element includes a charge pump.

In another preferred form, the control signal protection device is further configured to transition from the second operational mode to the first operational mode in response to detecting that the level of electric current supplied to the output of the control signal protection device has stopped decreasing.

In another preferred form, the control signal protection device is provided as an element separate from the field device.

DETAILED DESCRIPTION OF THE DRAWINGS

DETAILED DESCRIPTION

Figure 1:
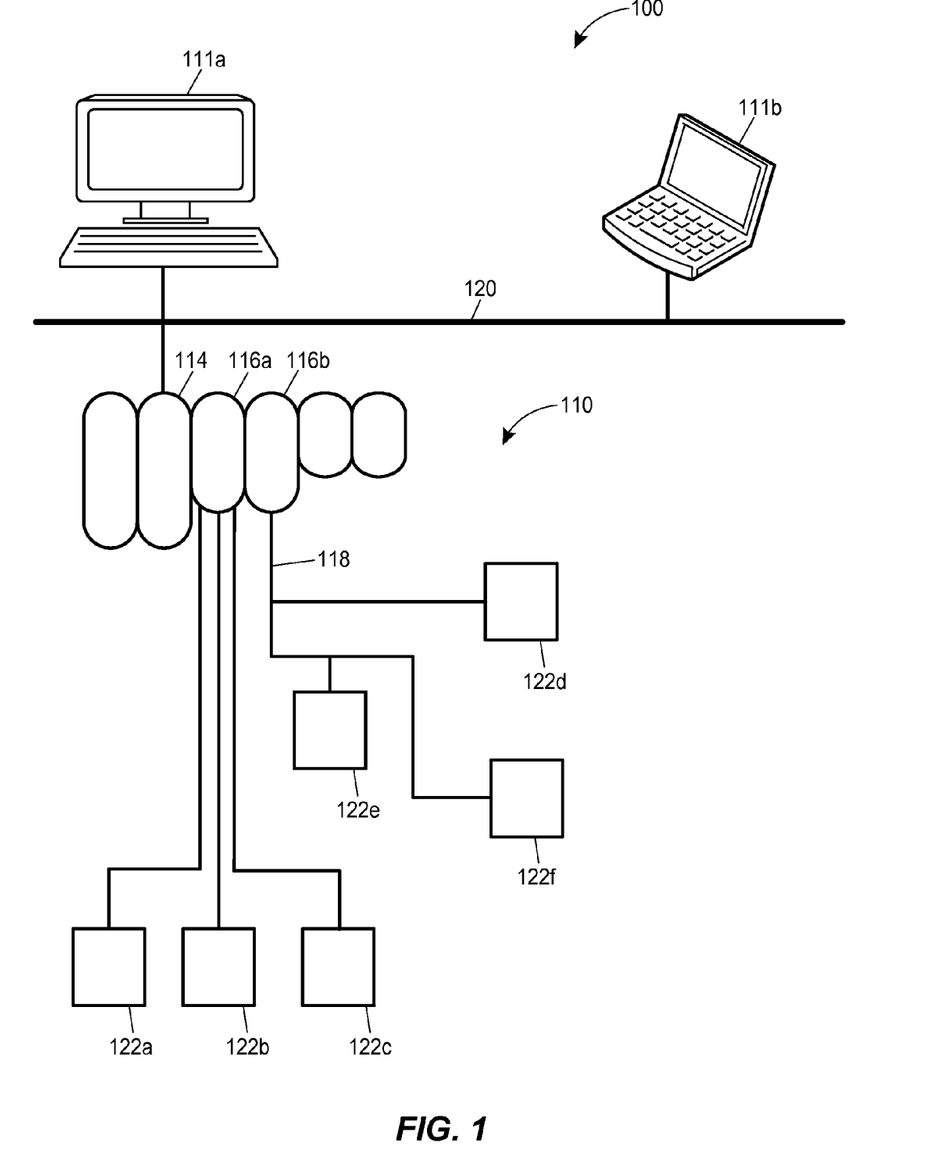
FIG. 1 illustrates a process control system incorporating control signal protection techniques in accordance with a disclosed example of the present invention.

FIG. 1 illustrates a process control system 100 incorporating control signal protection techniques in accordance with the present disclosure, according to an embodiment. The example process control system 100 includes a wired plant automation network 110 that operates according to an industrial automation protocol (e.g., HART, PROFIBUS DP (Decentralized Peripherals), etc.) or another suitable communication protocol. The wired plant automation network 110 includes one or more controllers 114 connected to one or more host stations or computers 111 (which may be any type of personal computer or workstation) and connected to banks of input/output (I/O) devices 116 each of which, in turn, is connected to one or more field devices 122. The controllers 114, which may be, by way of example only, DeltaV™ controllers sold by Fisher-Rosemount Systems, Inc., are communicatively coupled to the host stations 111 via, for example, an Ethernet connection 120 or other communication link. Likewise, the controllers 114 are communicatively coupled to the field devices 122 using any suitable hardware and software associated with, for example, standard 4-20 ma devices and/or any smart communication protocol such as the Fieldbus or HART protocols. As is generally known, the controllers 114 implement or oversee process control routines stored therein or otherwise associated therewith and communicate with the devices 122 to control a process in any desired manner.

The field devices 122 may be any types of devices, such valves, valve positioners, switches, sensors (e.g., temperature, pressure, vibration, flow rate, or pH sensors), pumps, fans, etc., or combinations of two or more of such types, while the I/O cards within the card bank 116 may be any types of I/O devices conforming to any suitable communication or controller protocol such as HART, Fieldbus, Profibus, etc. Field devices 122 perform process control, monitoring, and/or physical functions within a process or process control loop, such as opening or closing valves or taking measurements of process parameters, for example. In the embodiment illustrated in FIG. 1, the field devices 122a-122c are standard 4-20 ma devices that communicate over analog lines with the I/O card 116a. In another embodiment, the field devices 112a-122c are Hart devices and the I/O card 116a is a Hart compatible I/O card. In one embodiment, the control system 100 includes 4-20 ma devices as well as Hart devices. Accordingly, in this embodiment, the control system 100 includes one or more 4-20 ma compatible I/O cards as well as one or more Hart compatible I/O cards.

In the embodiment of FIG. 1, the field devices 122d-122f are smart devices, such as Fieldbus field devices, that communicate over the digital bus 118 to the I/O card 118 using, for example, Fieldbus protocol communications. Of course, the field devices 122 and the banks of I/O cards 116 could conform to any other suitable standard(s) or protocols besides the 4-20 ma, HART or Fieldbus protocols, including any standards or protocols developed in the future.

Each of the controllers 114 is configured to implement a control strategy using what are commonly referred to as function blocks, wherein each function block is a part (e.g., a subroutine) of an overall control routine and operates in conjunction with other function blocks (via communications called links) to implement process control loops within the process control system 100. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 100. Of course hybrid and other types of function blocks exist. Groups of these function blocks are called modules. Function blocks and modules may be stored in and executed by the controller 12, which is typically the case when these function blocks are used for, or are associated with standard 4-20 ma devices and some types of smart field devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any suitable proprietary or non-proprietary programming language.

Figure 2:
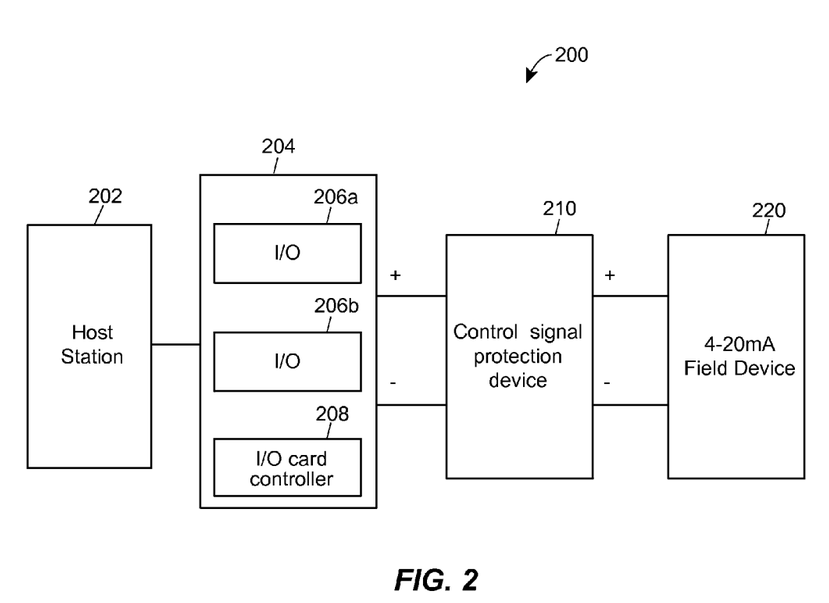
FIG. 2 is a schematic representation of a system in which a signal protection device may be utilized.

FIG. 2 is a schematic representation of a control system 200 in which a control signal protection device may be utilized to sustain a control signal in case an interruption in the control signal occurs. The control system 200 includes a host station 202 connected to a redundant I/O subsystem 204. Referring to FIG. 1, in an embodiment, the host station 202 corresponds to the host station 111a or the host station 111b, and the I/O subsystem 204 is included in the I/O card bank 116, for example. The output of the I/O subsystem 204 is provided to a field device 220 for controlling operation of the field device 220. The field device 220 may be a suitable 4-20 mA field device, such as a current to pressure transducer or a valve controller, for example, that may accept a control signal in the 4 to 20 mA range and convert the control signal to a pneumatic control signal for controlling the position of a valve.

The I/O subsystem 204 includes a redundant configuration that provides redundant control for the field device 220. In particular, the I/O subsystem includes a first I/O card 206a and a second I/O card 206b. The I/O card 206a may be a primary or active I/O card, while the I/O card 206b may be a back-up I/O card. An I/O card controller 208 may control the operation of the I/O subsystem 204 by automatically switching operation from the primary card 206a to the backup card 206b in an event of failure of the primary card 206a. Additionally, the I/O controller 208 may be configured to switch operation from the primary card 206a to the back-up card 206b periodically in order to verify functionality of the back-up card 206b. Switchover from the primary card 206a to the back-up card 206b, or from the back-up card 206b back to the primary card 206a, in general, may cause an interruption in the control signal at the output of the I/O subsystem 204. Such interruption in control signal provided to the field device 220 may cause certain undesired effects in the process being controlled. For example, temporary loss of control signal provided to a valve controller may cause the corresponding valve to move to an unintended position, thereby potentially disrupting normal operation of the process being controlled. Further, in some situations, temporary loss of a control signal may cause a valve controller to cause the valve to latch in a safe state, such as in a fully opened or in a fully closed position, for example, or in another predetermined position. For example, the valve controller may be associated with an emergency shutdown valve that, in response to a loss in a control signal, may cause the emergency shutdown valve to latch in a fully closed position to prevent flow of a liquid, for example. In such situations, return to normal operation of the valve may require an operator to manually unlatch the valve.

The system 200 includes a control signal protection device 210 connected in series with the I/O subsystem 204 and the field device 220. As illustrated in FIG. 2, the control signal protection device 210 includes a pair of input terminals 212 and a pair of output terminals 214. The input terminals 212 connect the control signal protection device 210 to a current loop (e.g., 4-20 mA current loop) that provides control signals from the I/O subsystem 204 to the field device 220. The output terminals 214 connect the control signal protection device 210 to control signal current loop terminals of the field device 220. Generally speaking, the control signal protection device 210 is configured to sustain a signal level (e.g., a voltage level) at the output terminals 214 of the control signal protection device 210 for a certain period of time in an event of a loss or temporary interruption of a control signal at the input terminals to the control signal protection device 210. To this end, the control signal protection device 210 may include or be coupled to a storage element (e.g., a capacitor) that may store sufficient amount of energy during normal operation of the control system 200 and may then utilize the stored energy to sustain the control signal at the output of the device 210 for the duration of a temporary interruption of the control signal at the input to the device 210. As a result, operation of the field device 220 will not be affected, or at least will not be significantly affected, by a temporary control signal loss, such as during a switchover operation between the primary card 206a and the backup card 206b. As an example, a control signal provided to a valve via the control signal protection device 210 will be maintained at a sufficient level above a shutdown threshold of the valve being controlled, and, as a result, the valve will not shut down in the event of a temporary control signal interruption, in an embodiment.

In an embodiment, the control signal protection device 210 operates by extracting a small amount of power from the control signal loop (e.g., 4-20 mA control signal loop) and storing the extracted power in a storage element (e.g., a capacitor) included in or coupled to the signal protection device 210. In a normal mode of operation of the signal protection device 210, when control signal is present at the input of the control protection device 210, the signal protection device 210 presents a filtered version of the control signal at the output of the control protection device 210. Thus, in the normal mode of operation, the control signal device 210 generally passes the control signal from the host station 202 to the field device 220 to control operation of the field device 220. In an embodiment, the signal protection device 210 is configured to pass the control signal from the host station 202 to the field device 220 without heavily filtering the control signal and, therefore, without significantly delaying the control signal provided to the field device 220. Further, in an embodiment, the control signal protection device 210 is configured to extract a sufficiently small amount of power from the control current loop so as to not disturb operation of the current loop, and to not significantly interfere with communication signals (e.g., HART communication signal) on the current loop, during normal operation of the control system 200.

In an embodiment, the control signal protection device 210 is configured to monitor the input current (or voltage) at the input terminals 212 and to detect when the input current (or voltage) at the input terminals 212 falls below a certain threshold, indicating a loss of a control signal from the I/O subsystem 204 at the input of the control signal protection device 210. In response to detecting the loss of control signal at the input of the control signal protection device 210, the control signal protection device 210 is configured to switch operation to a protection mode, in which power stored in the storage element is utilized to sustain a control signal level across the output terminals 214 of the control signal protection device 210. The control signal protection device 210 is also configured to detect when the monitored input current (or voltage) at the input terminals 212 rises above the threshold, indicating that the control signal from the I/O subsystem 204 has been reestablished. When detected that the control signal has returned at the input to the control signal protection device 210, the control signal protection device 210 is configured to switch operation to the normal mode of operation, in which a filtered version of the control signal present at the input terminals 212 of the control signal protection device 210 is transferred to the output terminals 214 of the control signal protection device 210. In another embodiment, instead of monitoring the input current (or voltage) at the terminals 212, the control signal protection device 210 operates by detecting a drop in the output current (or voltage) at the output terminals 214 of the signal protection device 210. That is, in this embodiment, a detected drop in the output current (or voltage) may indicate a loss of a control signal supplied to the control signal protection device 210. In this embodiment, the control signal protection device 210 need not include functionality of monitoring the input current (or voltage) at the input terminals 212. The control signal protection device 210 may operate in the normal operating mode when the control signal is being supplied to the control signal protection device 212, and may switch operation to the protection mode in response to detecting a drop in current (or voltage) at the output terminals 214.

The control signal protection device 210 may be integrated with the field device 220. For example, the control signal protection device 210 may be integrated into a local control panel provided with a field device to manually operate the field device, such as to manually open or close a safety shutdown valve. As another example, the control signal protection device 210 may be integrated into a HART filter device provided to facilitate HART communication between the field device 220 and the host station 202, for example when the field device 220 is not configured for communication according to the HART communication protocol. Alternatively, the field device 210 may be provided as an external component that may connect serially with the control input to the field device 220. In some embodiments, the control signal protection device 210 may be a multi-channel device capable of providing control signal protection for multiple control inputs of the field device 220 and/or for respective control inputs of multiple field devices.

Figure 3:
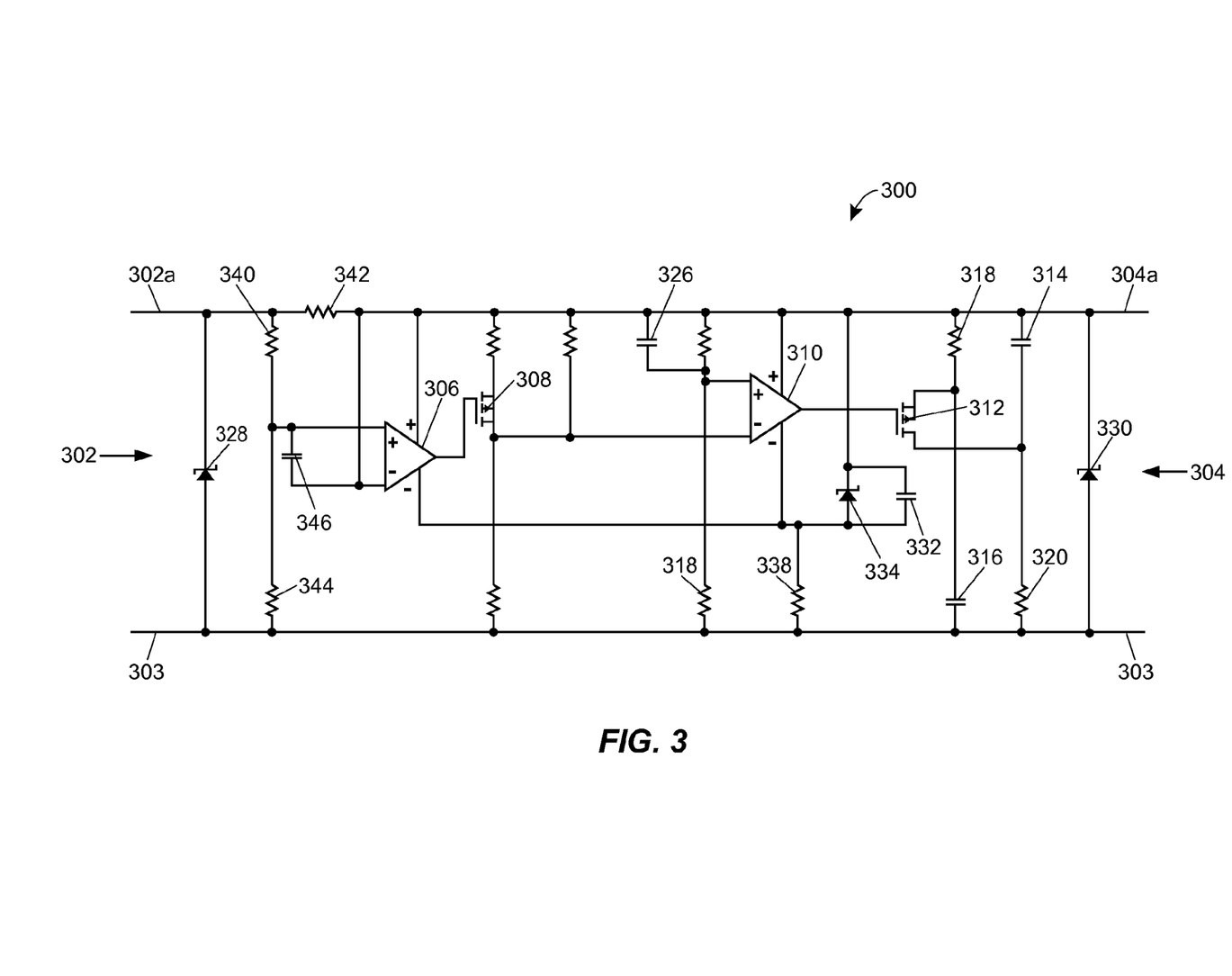
FIG. 3 is an electrical diagram illustrating an interruption ride-through switching circuit, that may be included in a signal protection device, in one possible circuit configuration.

FIG. 3 is a diagram illustrating an interruption ride-through switching circuit 300 corresponding to one possible implementation of the control signal protection device 210. The circuit 300 includes an input port 302 having a positive input terminal 302a, and an output port 304 having a positive output terminal 304a. Additionally, the circuit 300 includes a ground terminal 303 which may be coupled to a common ground of the circuit 300. The input port 302 may be communicatively coupled to an output of an I/O card subsystem within a control system. The output port 304 may be connected to a field device, such as to a valve controller, for example. Even though the circuit 300 is illustrated in FIG. 3 as a three terminal device having a common ground terminal 303, the circuit 300 may be implemented as a four terminal device having a pair of input terminals and a pair of output terminals, in some embodiments. For example, respective ground terminals may be provided for the input port 302 and the output port 304, in such embodiments.

In operation, the circuit 300 extracts or harvests a small amount of electric energy generated by the current flowing through the circuit 300 and storing this extracted power in a power storing element within the circuit 300, and utilizes the stored energy to maintain a desired voltage level at the output terminal 304a in an event of a short interruption of the current entering the circuit 300 at the input terminals 302, such as due to a temporary control signal loss during an I/O card switchover operation. Alternatively, circuits similar to the circuit 300 may operate by using the stored power to supply a desired current (rather than voltage) to the output terminals 304 during an interruption in input current to the circuit 300.

The circuit 300 may include a first switch 308 and a first current control device 312. Each of the devices 308 and 312 may be a Metal Oxide Semiconductor Field Effect Transistor (MOSFET), a different type of a transistor, or any other electronic switching means known in the art. A first operational amplifier ("op amp") 306 may be provided to control the operating state of the switch 308, and a second operational amplifier 310 may be provided to control the current in the device 312. It will be appreciated that discrete transistors may be used as control elements for controlling the operation of the devices 306 and 308 in place of the op amps 306 and 310, in some embodiments.

When current entering the circuit 300 is sufficiently high (e.g., greater than 2 mA), the circuit 300 may operate in a normal operating mode by supplying the current to the output terminals 304. In the normal operational mode, the output of the op amp 306 is sufficiently high to keep the switch 308 in an open state. Consequently, the inputs to the op amp 310 may be such that the op amp 310 operates in a saturated state. As illustrated, the output of the op amp 310 is used to control the current in the device 312. In particular, the saturated state of the op amp 310 maintains the current in the device 312 at or near 0 mA.

With continued reference to FIG. 3, a capacitor 314 and a capacitor 316 are provided to store power during the normal operational mode of the circuit 300 for sustaining output voltage across the output terminal 304a for the duration of a temporary interruption of the control signal provided to the circuit 300. In order to store power in the capacitors 314 and 316 during the normal operational mode of the circuit 300 at a sufficiently low rate as to not interfere with the normal operation of the circuit 300, for example to maintain a sufficiently low delay introduced by the circuit 300, or to not interfere with normal communication (e.g., HART communication) on the loop, the rate of storage of energy in the capacitors 314, 316 is controlled by resistors 320 and 318, respectively. As an alternative to the two capacitor configuration used for power storage as illustrated in FIG. 3, in some embodiments, a single capacitor may be used as the power storing element in the circuit 300. Alternatively, other methods of storing power may be utilized. For example, a charge pump or an inductive boost circuit may be provided. In such embodiments, power may be stored at a higher voltage level than the voltage level across the input terminals 302 of the circuit 300.

The current entering the circuit 300 may be monitored by a current monitoring circuit for the purpose of controlling the operational mode of the circuit 300. In the embodiment of FIG. 3, the current monitoring circuit comprises a combination of resistors 340, 342 and 344 along with a capacitor 346 coupled across the input terminals of the op amp 306. When the input current entering the circuit 300 falls below a certain threshold (e.g., below 2 mA) the current monitoring circuit causes the circuit 300 to switch operation from the normal operational mode of the circuit 300 to a protection operational mode of the circuit 300. In the protection operational mode, the voltage at the output terminals 304 of the circuit 300 is sustained at a desired level for the duration of the interruption of current entering the circuit 300. Because very little or no current enters the circuit 300, in this operational mode, the voltage across the resistor 342 drops, causing the voltage level at the inverting input terminal of the op amp 306 to become greater than, or positive relative to, the voltage level at the non-inverting input of the op amp 306. The resulting voltage level at the output of the op amp 306 causes the switch 308 to transition to a closed state. The closed state of the switch 308, in turn, results in a zero (or near zero) input voltage to the op amp 310, provided that the output voltage across the output terminals 304 remains at least substantially unchanged. A drop in voltage across the output terminals 304, such as due to a loss of a control signal at the input terminals 302, and a continued load on the output terminals 304, will result in the voltage at the non-inverting input terminal of the op amp 310 lower than, or negative relative to, the voltage at the inverting input terminal of the op amp 310, causing the voltage at the output of the op amp 310 to drop. A drop of the voltage at the output terminal of the op amp 310 will, in turn, cause the device 312 to begin conducting current from the positive terminal of the capacitor 316 to the negative terminal of the capacitor 314. As a result, the energy stored in the capacitors 314 and 316 is supplied to the output terminal 304a. In other words, when operating in the protection mode, the circuit 300 operates by throttling current in the device 312 such that the voltage across the output terminals 304 is sustained at a level at least substantially the same as the voltage level across the output terminals 304 when the circuit 300 is operating in the normal mode, prior to operation being transitioned to the protection mode.

The voltage level maintained across the output terminals 304 of the circuit 300 in the protection operational mode of the circuit 300 is determined by a voltage maintaining element included in the circuit 300, such as the capacitor 326. The voltage across the capacitor 326 is a scaled and filtered version of the voltage presented across the output terminals 304. Thus, when the circuit 300 transitions from the normal operational mode to the protection operational mode, the voltage across the output terminals 304 of the circuit 300 is sustained at a substantially the same voltage level across the terminals 304 prior to the input current interruption (i.e., in the normal operational mode). As a result, the voltage across the output terminals 304, and consequently the current supplied to a load coupled to the output terminals 304, does not experience a significant change during a control signal interruption at the input terminals 302 of the circuit 300.

Subsequently, when control signal is returned to the circuit 300, such as upon completion of switchover from the primary I/O card 206a to the back-up I/O card 206b in the I/O subsystem 204 (FIG. 2), electric current at the input terminals 302 of the circuit 300 increases and crosses the threshold value determined by the current monitoring element of the circuit 300. When input current is above the threshold level (e.g., above 2 mA), op amps 306 and 310 control respective switches 308 and 312 to transition to an open state. Accordingly, in this case, the circuit 300 returns to the normal operational mode.

In some embodiments, the circuit 300 includes additional components to improve performance of the circuit 300 and/or increase robustness of the circuit 300 in presence of transient noise or interference in the circuit 300. For example, the implementation of the circuit 300 illustrated in FIG. 3 includes Zener diodes 328, 330 connected across the input terminals 302 and across the output terminals 304, respectively, of the circuit 300. The Zener diodes 328, 330 are provided for protection of the circuit 300 against transient interference at the input and the output of the circuit 300. A capacitor 332 may be provided to filter the voltage supplied to the op amps 306 and 310 to improve performance of the op amps 306 and 310. Further, a Zener diode 334 and a resistor 338 may be used to supply desired voltage-limited power to the op amps 306 and 310. To this end, the Zener diode 334 and the resistor 338 may be selected in accordance with the maximum voltage specified for the particular op amps 306 and 310 being utilized. It should be noted that such additional components may not be necessary for proper operation of the circuit 300 and at least some of the additional components are omitted from the circuit 300 in some implementations.

Figure 4:
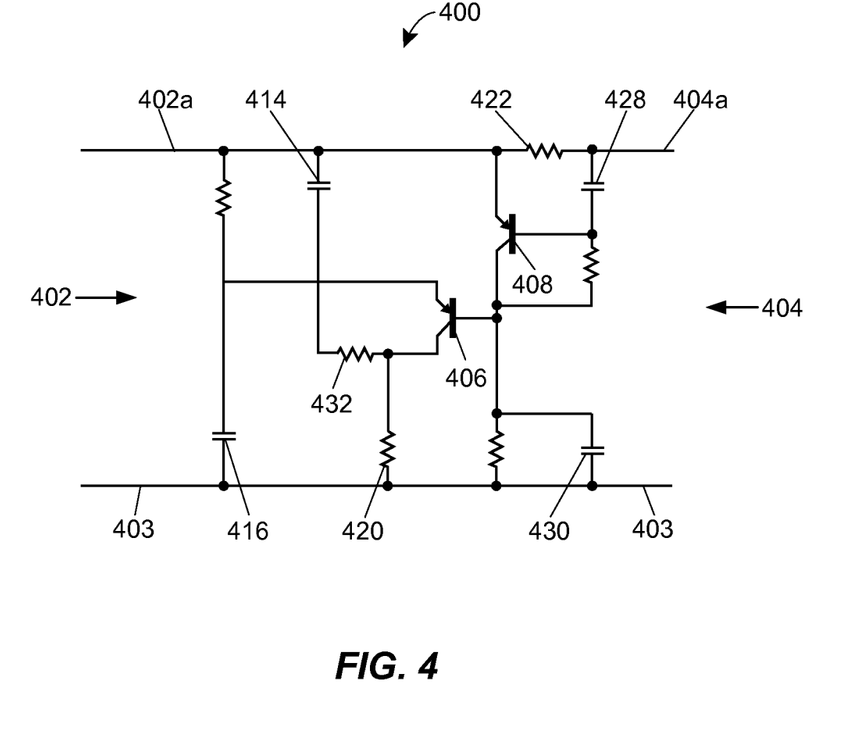
FIG. 4 is an electrical diagram illustrating an interruption ride-through switching circuit, that may be included in a signal protection device, in another possible circuit configuration.

FIG. 4 is a diagram illustrating an interruption ride-through switching circuit 400 corresponding to another possible implementation of the control signal protection device 210. The circuit 400 is generally similar to the circuit 300 and operates in a manner similar to the circuit 300. However, the circuit 400 omits the input current monitoring portion of the circuit 300, and instead monitors a current level (or voltage level) at the output of the circuit 400. Accordingly, the circuit 400 is configured to transition between the normal operational mode and the protection operational mode by detecting or sensing a change in output current (or voltage), at the output of the circuit 400.

The circuit 400 includes an input port 402 having a positive input terminal 402a, and an output port 404 having a positive output terminal 404a. Additionally, the circuit 400 includes a ground terminal 403 which may be coupled to a common ground of the circuit 400. The input port 402 may be communicatively coupled to an output of an I/O card subsystem within a control system. The output port 404 may be connected to a field device, such as to a valve controller, for example. Even though the circuit 400 is illustrated in FIG. 4 as a three terminal device having a common ground terminal 403, the circuit 400 may be implemented as a four terminal device having a pair of input terminals and a pair of output terminals, in some embodiments. For example, respective ground terminals may be provided for the input port 402 and the output port 404, in such embodiments. Similar to the circuit 300, the circuit 400 operates by extracting or harvesting a small amount of electric energy generated by the current flowing through the circuit 400 in a normal mode of operation of the circuit 400, and supplying the harvested power to the output terminals 404 in a protection mode of the circuit 400.

The circuit 400 may include a first switching device 406 and a second switching device 408. Each of the switching devices 406 and 408 may be a Bipolar Junction Transistor (BJT), a Metal Oxide Semiconductor Field Effect Transistor (MOSFET), a different type of a transistor, or any other electronic switching means known in the art. The circuit 400 may also include a capacitor 414 and a capacitor 416 to store power during normal mode of the circuit 400. Generally speaking, the circuit 400 accumulates energy in the capacitors 414, 416 during the normal operational mode of the circuit 400 and, in response to detecting a decrease, such as a sudden drop, in a level of electric current at the output terminal 404a, transitions to the protection operational mode, in which the circuit 400 throttles electric current from the capacitors 414 and 416 to the output terminal 404a to maintain a desired voltage level at the output terminal 404a of the circuit 400. Subsequently, the circuit 400 may detect that the level of electric current at the output terminal 404a has stopped decreasing, and, in response to detecting that the level of electric current has stopped decreasing, the circuit 400 may transition back to the normal operational mode and begin to again accumulate energy in capacitors 414, 416, in an embodiment.

In operation, in the normal operational mode of the circuit 400, the switching device 408 is kept in a conducting state in which sufficient current flows through the switching device 408 to keep the switching device 406 in a substantially non-conductive state. As a result, in the normal operational mode of the circuit 400, due to sufficiently low conductivity through the switching device 406, a small amount of current entering the circuit 400 is supplied to the capacitors 414 and 416. Resistors 418 and 420 are provided in the circuit 400 to control the amount of current supplied to the capacitors 414 and 416, respectively, during normal operational mode of the circuit 400, such that the capacitors 414 and 416 are charged at a suitably low rate so as to not interfere with normal operation of the circuit 400 and, consequently, to not interfere with normal control of the field device connected to the circuit 400. For example, the rate of current supplied to the capacitors 414 and 416, via the resistors 418 and 420, is kept at a suitably low level to maintain a sufficiently low delay introduced by the circuit 400 and/or to not interfere with normal communication (e.g., HART communication) on the control loop, in an embodiment.

As an alternative to the two capacitor configuration used for power storage as illustrated in FIG. 4, in some embodiments, a single capacitor may be used as the power storing element in the circuit 400. Alternatively, other methods of storing power may be utilized. For example, a charge pump or an inductive boost circuit may be provided. In such embodiments, power may be stored at a higher voltage level than the voltage level across the input terminals 402 of the circuit 400.

A current monitoring element, such as a resistor 422, is provided to monitor the output current of the circuit 400, i.e. a level of electric current at the output terminal 404a of the circuit 400. A decrease, such as a sudden drop, in the level of electric current at the output terminal 404a, and a corresponding drop in voltage across the resistor 422, causes a decrease in conductivity of the switching device 408. Decreased conductivity of the switching device 408 causes an increase in conductivity of the switching device 406, effectively connecting the negative terminal of the capacitor 414 to the positive terminal of the capacitor 416, thereby causing transfer of power from the capacitors 414 and 416 to the output terminal 404a of the circuit 400. Accordingly, a drop in the level of the output current at the output terminal 404a of the circuit 400, such as during a temporary interruption in a control signal supplied to the input terminals 402 of the circuit 400, results in a transfer of power stored in the capacitors 414, 416 to the output terminal 404a of the circuit 400. As a result, during an interruption in the input control signal supplied to the circuit 400, such as during a switchover operation in the subsystem 204 (FIG. 2), current (or voltage) supplied to the control input of the field device to which the circuit 400 is coupled via the output terminals 404 will remain at a level at least substantially the same as the level supplied to the control input of the field device during normal mode of operation of the circuit 400.

Subsequently, when the signal level at the input terminal 402a is reestablished, such as upon completion of the switchover operation in the subsystem 204 (FIG. 2), the voltage across the resistor 422 returns to a sufficiently high level to reverse the operational mode of the circuit 400 back to the normal operational mode of the circuit 400. In other words, as the voltage drop across the resistor 422 increases, conductivity of the switch 408 increases. Increasing conductivity of switch 408, in turn, decreases conductivity of the switch 406, thereby resuming accumulation of power in the capacitors 414 and 416.

In the embodiment illustrated in FIG. 4, the circuit 400 includes a capacitor 430 and a resistor 432 to improve operation of the circuit 400, for example to enhance stability of the circuit 400. In some embodiments, however, the circuit 400 omits the capacitor 430 and the resistor 432 and/or includes other components, in addition to or instead of the capacitor 430 and the resistor 432, to generally enhance operation of the circuit 400 or to tailor operation of the circuit 400 to a particular application that utilizes the circuit 400.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A control signal protection device having a first operational mode and a second operational mode, comprising:
    a first terminal to connect the signal protection device to a control system, wherein the control system provides a control signal;
    a second terminal to connect the signal protection device to a field device for providing the control signal to the field device;
    a power storing element for temporary accumulation of electric energy; and
    a switching circuit coupled to the first terminal, the second terminal, and the power storing element, the switching circuit configured to control the operational mode of the signal protection device in response to detecting a decrease in the level of electric current at the second terminal of the control signal protection device, wherein
    electric energy is accumulated in the power storing element in the first operation mode, and
    electric energy accumulated in the power storing element in the first operation mode is transferred to the second terminal in the second operational mode.

2. The control signal protection device according to claim 1, wherein the switching circuit is further configured to switch the operational mode from the second operational mode to the first operational mode in response to detecting that the level of electric current at the second terminal has stopped decreasing.

3. The control signal protection device according to claim 1, wherein the power storing element includes at least one capacitor.

4. The control signal protection device according to claim 1, wherein the power storing element includes a first capacitor and a second capacitor, and wherein:
    electric energy is accumulated in the first capacitor and in the second capacitor in the first operational mode, and
    electric energy is transferred from the first capacitor and the second capacitor to the second terminal in the second operational mode.

5. The control signal protection device according to claim 1, wherein the switching circuit includes a first switching element and a second switching element arranged such that in the first operational mode, the first switching element is kept in a conducting state such that sufficient current flows through the first switching element to keep the second switching element in a sufficiently non-conductive state, and wherein the sufficiently non-conductive state of the second switching element causes accumulation of energy in the power storing element.

6. The control signal protection device according to claim 5, wherein the first switching element and the second switching element are further arranged such that a decrease in the level of electric current at the second terminal causes a decrease in conductivity of the first switching element, and wherein the decrease in conductivity of the first switching element causes an increase in conductivity of the second switching element to cause the transfer of energy stored in the power storing element to the second terminal in the second operational mode.

7. The control signal protection device according to claim 5, wherein each of the first switching element and the second switching element is a Bipolar Junction Transistor (BJT).

8. The control signal protection device according to claim 1, further comprising a current monitoring element coupled to the second terminal to detect the variation of current level at the second terminal.

9. The control signal protection device according to claim 8, wherein the current monitoring element is a resistor.

10. The control signal protection device according to claim 1, wherein the first operational mode is a normal mode in which the control signal is provided to the first terminal, and wherein the second operational mode is a protection mode in which the control signal is not provided to the first terminal.

11. A method of protecting a control signal provided to a field device in a process control system, the method comprising:
    providing a host station;
    communicatively coupling the host station to an input output (I/O) system having a plurality of I/O cards including a first card and a second card, wherein operation is selectively switched from the first card to the second card;
    providing a control signal from the host station via the I/O system to an input of a control signal protection device, wherein an output of the control signal protection device is communicatively coupled to the field device; and
    causing the control signal protection device to switch from a first operational mode to a second operational mode during a transition of operation, in the I/O system, from the first card to the second card, wherein the control signal protection device transitions from the first operational mode to the second operational mode in response to detecting a decrease in a level of electric current at the output of the control signal protection device.

12. The method according to claim 11, further comprising storing electric energy in a power storing element of the control signal protection device in the first operational mode; and supplying electric energy stored in the power storing element to the output of the control signal protection device in the second operational mode.

13. The method according to claim 12, wherein storing electric energy in the power storing element comprises storing the electric energy in a first capacitor and a second capacitor, and wherein supplying electric energy to the output of the control signal protection device comprises transferring electric energy stored in the first capacitor and in the second capacitor to the output of the control signal protection device.

14. The method according to claim 9, further comprising causing the control signal protection device to transition from the second operational mode to the first operational mode in response to detecting that the level of electric current at the output of the signal protection device has stopped decreasing.

15. A system for controlling a field device in a process control system, comprising:
   a host station;
   a plurality of input/output (I/O) cards coupled to the host station for providing a control signal to the field device, wherein the plurality of I/O cards includes a primary I/O card and a back-up I/O card;
   an I/O card controller configured to selectively switch between the primary I/O card and the backup I/O card; and
   a control signal protection device having an input communicatively coupled to the I/O cards and an output communicatively coupled to the field device, wherein the control signal protection device is configured to transition from a first operational mode to a second operational mode in response to detecting a decrease in a level of electric current at the output of the control signal protection device to sustain the control signal at the output of the control signal protection device during a switchover operation between the primary I/O card and the backup I/O card.

16. The system according to claim 15, wherein the control signal protection device is configured to:
   store electric energy in a power storing element in the first operational mode; and
   supply electric energy stored in the power storing element to the output terminal in the second operational mode.

17. The system according to claim 16, wherein the power storing element includes at least one capacitor.

18. The system according to claim 16, wherein the power storing element includes a first capacitor and a second capacitor, and wherein
   electric energy is accumulated in the first capacitor and in the second capacitor in the first operational mode, and
   electric energy is transferred from the first capacitor and the second capacitor to the output terminal in the second operational mode.

19. The system according to claim 16, wherein the power storing element includes a charge pump.

20. The system according to claim 15, wherein the control signal protection device is further configured to transition from the second operational mode to the first operational mode in response to detecting that the level of electric current supplied to the output of the control signal protection device has stopped decreasing.

21. The system according to claim 15, wherein the control signal protection device is provided as an element separate from the field device.

* * * * *